(12) United States Patent
Ku et al.

(10) Patent No.: US 10,327,192 B2
(45) Date of Patent: Jun. 18, 2019

(54) METHOD OF PERFORMING CELL RESELECTION BY A USER EQUIPMENT IN A WIRELESS COMMUNICATION SYSTEM AND APPARATUS THEREFOR

(71) Applicant: LG ELECTRONICS INC., Seoul (KR)

(72) Inventors: Gwanmo Ku, Seoul (KR); Jaewook Lee, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/705,070

(22) Filed: Sep. 14, 2017

(65) Prior Publication Data

US 2019/0082372 A1  Mar. 14, 2019

(51) Int. Cl.
*H04W 36/36* (2009.01)
*H04W 36/00* (2009.01)

(52) U.S. Cl.
CPC ....... *H04W 36/36* (2013.01); *H04W 36/0072* (2013.01); *H04W 36/0083* (2013.01)

(58) Field of Classification Search
CPC ............. H04W 36/36; H04W 36/0012; H04W 36/0083; H04W 72/0453
See application file for complete search history.

(56) References Cited

U.S. PATENT DOCUMENTS

| | | | |
|---|---|---|---|
| 6,215,768 B1* | 4/2001 | Kim | H04Q 11/0478 370/230 |
| 2010/0222055 A1* | 9/2010 | Cho | H04J 11/0086 455/434 |
| 2013/0225169 A1* | 8/2013 | Farnsworth | H04W 60/04 455/436 |
| 2014/0113633 A1* | 4/2014 | Lee | H04W 36/08 455/436 |
| 2015/0271718 A1* | 9/2015 | Gopal | H04W 36/0088 455/436 |
| 2016/0073312 A1* | 3/2016 | Sridhar | H04W 48/16 370/235 |
| 2016/0302118 A1* | 10/2016 | Yiu | H04W 72/082 |

* cited by examiner

*Primary Examiner* — Charles N Appiah
*Assistant Examiner* — Xiang Zhang
(74) *Attorney, Agent, or Firm* — Lee Hong Degerman Kang Waimey

(57) ABSTRACT

Disclosed are a method and apparatus for performing a cell reselection by a user equipment in idle mode in a wireless communication system. The present invention includes receiving system information containing redistribution parameters, triggering a redistribution procedure, and selecting a redistribution target based on the redistribution parameters. Particularly, the redistribution parameters contain current redistribution statistic information and the redistribution target is selected based on the current redistribution statistic information.

14 Claims, 12 Drawing Sheets

METHOD OF PERFORMING CELL RESELECTION BY A USER EQUIPMENT IN A WIRELESS COMMUNICATION SYSTEM AND APPARATUS THEREFOR

BACKGROUND OF THE INVENTION

Field of the Invention

The present invention relates to a wireless communication system, and more particularly, to a method of performing cell reselection by a user equipment and apparatus therefor.

Discussion of the Related Art

As an example of a wireless communication system to which the present invention is applicable, a 3rd generation partnership project long term evolution (3GPP LTE) (hereinafter, referred to as "LTE") communication system is described in brief.

FIG. 1 is a diagram schematically illustrating a network structure of an E-UMTS as an exemplary wireless communication system. An evolved universal mobile telecommunications system (E-UMTS) is an advanced version of a legacy universal mobile telecommunications system (UMTS) and basic standardization thereof is currently underway in the 3GPP. E-UMTS may be referred to as a long term evolution (LTE) system.

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although wireless communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

SUMMARY OF THE INVENTION

Accordingly, embodiments of the present invention are directed to a method of performing cell reselection by a user equipment and apparatus therefor that substantially obviate one or more problems due to limitations and disadvantages of the related art.

One object of the present invention is to provide a method for a user equipment to perform cell reselection in a wireless communication system.

Another object of the present invention is to provide a method for a user equipment in idle mode to perform cell reselection.

Further object of the present invention is to provide a method for a user equipment to perform cell reselection beforehand in consideration of load balancing.

Another further object of the present invention is to provide a method of performing cell reselection by minimizing power consumption of a user equipment.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of performing a cell reselection by a user equipment in idle mode in a wireless communication system, comprising: receiving system information containing redistribution parameters, triggering a redistribution procedure, and selecting a redistribution target based on the redistribution parameters, wherein the redistribution parameters contain current redistribution statistic information and wherein the redistribution target is selected based on the current redistribution statistic information.

To achieve these objects and other advantages and in accordance with the purpose of the invention, as embodied and broadly described herein, in performing a cell reselection, a user equipment in idle mode in a wireless communication system, comprising a receiving module receiving a signal, a transmitting module transmitting a signal and a processor configured to control the receiving module and the transmitting module, wherein the processor is further configured to receive system information containing redistribution parameters using the receiving module, trigger a redistribution procedure, and select a redistribution target based on the redistribution parameters, wherein the redistribution parameters contain current redistribution statistic information, and wherein the redistribution target is selected based on the current redistribution statistic information.

Moreover, the following matters can apply to a method of performing a cell reselection in a wireless communication system and apparatus therefor.

In accordance with one embodiment of the present specification, the user equipment is camped on the selected redistribution target when the user equipment switches to a connected mode from the idle mode.

In accordance with one embodiment of the present specification, the redistribution target is determined in further consideration of previous redistribution statistics information.

In accordance with one embodiment of the present specification, the previous redistribution statistic information is sent to the user equipment by being contained in the redistribution parameters.

In accordance with one embodiment of the present specification, the previous redistribution statistic information comprises information stored in the user equipment.

In accordance with one embodiment of the present specification, the user equipment contains list information and wherein each of the current redistribution statistics information and the previous redistribution statistics information comprises information indicating a redistribution probability for respective frequencies contained in the frequency list information.

In accordance with one embodiment of the present specification, based on a difference value between the redistribution probability for the respective frequencies contained in the current redistribution statistics information and the redistribution probability for the respective frequencies contained in the previous redistribution statistics information, the respective frequencies are grouped.

In accordance with one embodiment of the present specification, the respective frequencies are grouped into a first group having the difference value set to a positive number, a second group having the difference value set to zero, and a third group having the difference value set to a negative number.

In accordance with one embodiment of the present specification, the user equipment determines a serving frequency as the redistribution target when the user equipment is camped on a frequency included in the first group and the second group.

In accordance with one embodiment of the present specification, the user equipment determines distribution ranges and then determines the redistribution target based on the determined distribution ranges when the user equipment is camped on a frequency included in the third group.

Accordingly, the present invention provides the following effects and/or advantages.

First of all, the present specification can provide a method for a user equipment to perform cell reselection.

Secondly, the present specification can provide a method for a user equipment in idle mode to perform cell reselection.

Thirdly, the present specification can provide a method for a user equipment to perform cell reselection beforehand in consideration of load balancing.

Fourthly, the present specification can provide a method of performing cell reselection by minimizing power consumption of a user equipment.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
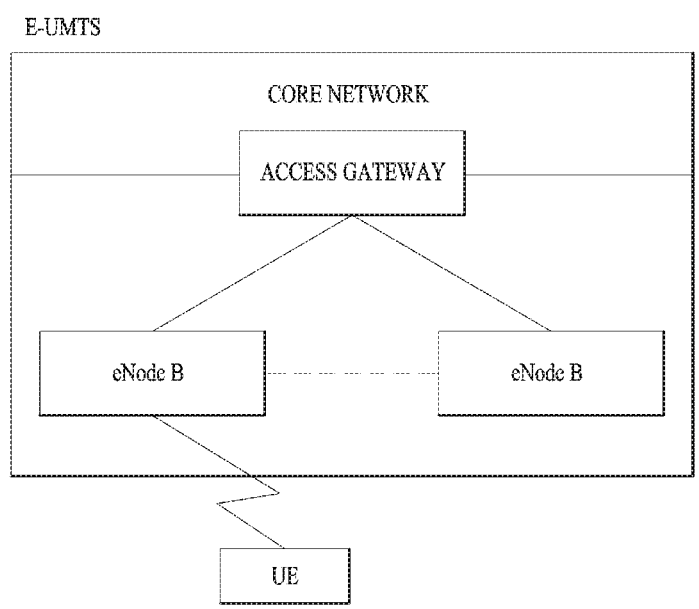
FIG. 1 is a diagram schematically illustrating a network structure of an E-UMTS as an exemplary wireless communication system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a device is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a device as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS). 3GPP LTE is a part of Evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
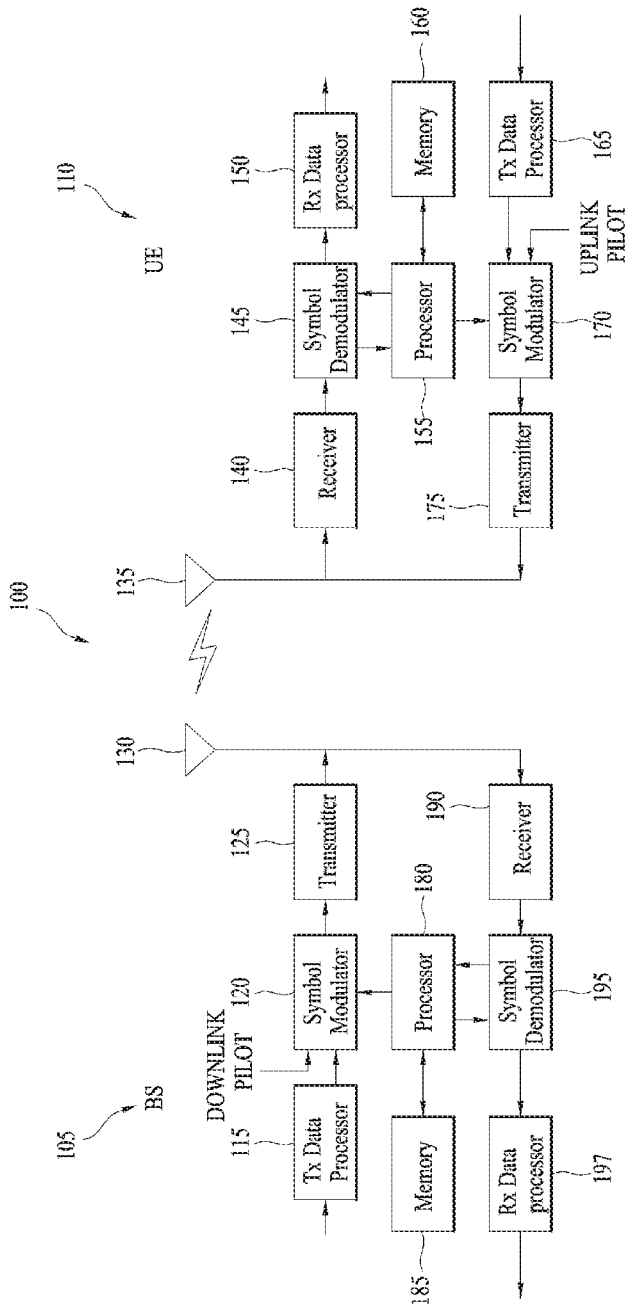
FIG. 2 is a block diagram for configurations of BS and a UE in a wireless communication system.

FIG. 2 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 2, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
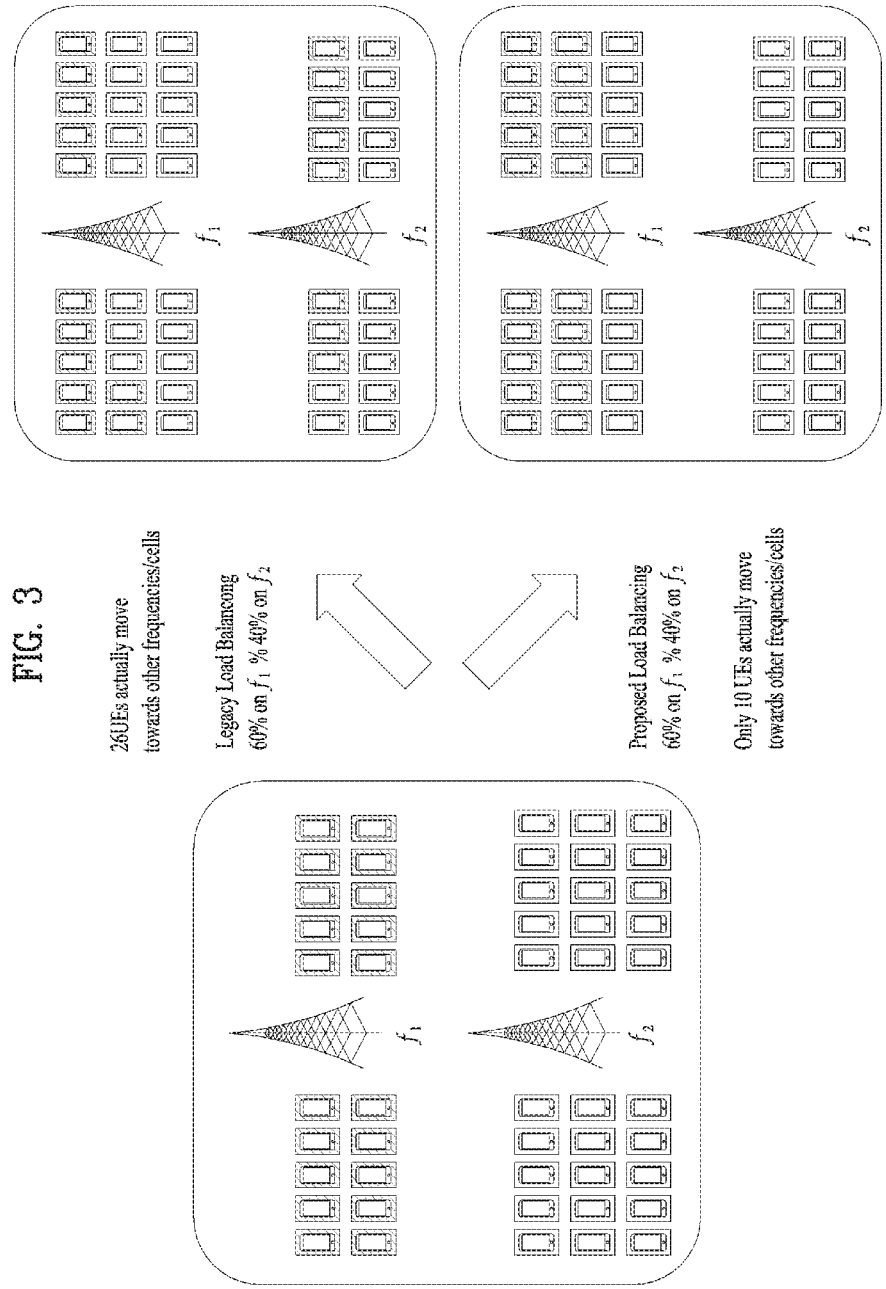
FIG. 3 represents load balancing mechanism to avoid undesirable cell reselection.

FIG. 3 represents load balancing mechanism to avoid undesirable cell reselection.

With regard to a redistribution mechanism, UE chooses a redistribution target corresponding to intended distribution. However, the redistribution mechanism makes it difficult to minimize number of cell reselection since the mechanism does not consider that as many UEs are intended to stay on a serving frequency/cell and minimum number of UEs actually moves towards other frequencies/cells.

In the prior art, legacy redistribution mechanism makes it difficult to minimize number of cell reselection. Since as many UEs are intended to stay on a serving frequency/cell, minimum number of UEs need to move towards other frequencies/cells. If network wants to partially redistribute UEs among carriers, network can broadcast (intended) redistribution parameters in system information.

More specifically, according to FIG. 3, assume that 20 UEs and 30 UEs are currently camped on frequency 1 and frequency 2, respectively. In order to perform load balancing, network broadcasts intended redistribution parameters (60% on f1 and 40% on f2) in system information.

While total 26 UEs actually move towards other frequencies when applying legacy load balancing mechanism as specified in the prior art, only 10 UEs need to move towards other frequency when applying proposed load balancing mechanism.

As described above, when an existing redistribution scheme is used, an unnecessary user equipment moves to another frequency, it may cause a problem that power consumption of a user equipment (UE) increases. Hence, in case of performing redistribution in consideration of load balancing, by minimizing a frequency movement of a UE, it is able to reduce power consumption of the UE, which is described as follows.

First of all, a UE can operate in idle or connected mode. In doing so, for example, if there exists data to be sent or received data by the UE, the UE may switch to the connected mode. If there is no information supposed to be sent or received by the UE, the UE may switch to the idle mode.

In doing so, for example, when a UE in connected mode is able to communicate with a specific base station on a specific frequency, if the UE communicates with the specific base station through the specific frequency, the UE may be in a state of being camped on the base station. Namely, if the UE switches to the connected mode from the idle mode, the UE can communicate with the camped-on base station through a determined frequency. Yet, if the UE is in idle mode, the base station may not be able to recognize camped-on UEs. If a UE sends a request by switching to a connected mode, the base station may recognize an existence of the UE. Hence, in aspect of a base station, if a multitude of UEs simultaneously send requests, information to be processed increases and a problem of load balancing may be caused. Namely, if a UE switches to a connected mode, a load balancing problem may be caused.

In this case, when the UE switches to the connected mode, if the base station performs the load balancing, overhead may increase and a corresponding processing may be delayed. Hence, when a UE is in idle mode, it is necessary to perform a balancing on a base station by performing a load balancing in advance.

In doing so, for example, if a UE is in idle mode, the UE may not receive information from a base station. Yet, the UE may receive system information periodically broadcasted by the base station. In this case, the system information may contain information on redistribution in consideration of load balancing. For example, the system information may contain priority information on the base station.

If the UE switches to the connected mode station based on the priority information on the base station, the UE can communicate with a specific base station through a specific frequency. In doing so, for example, regarding a method for a UE to select a base station (or, a cell) by receiving system information, the UE can operate based on LTE standard like Table 1, by which the method is non-limited. And, a further detailed operation may refer to the aforementioned LTE standard document, which is non-limited by the aforementioned embodiment.

TABLE 1

TS36.304 User Equipment (UE) procedures in idle mode (Release 14)
5.2.4.10.1 Redistribution target selection The UE shall compile a sorted list of one or more candidate redistribution targets, and for each candidate entry [j] a valid redistrFactor[j], in which entries are added in increasing index order starting with index 0 as follows:
for the serving frequency (redistributionFactorServing is included in SystemInformationBlockType3 whenever redistribution is configured):
the serving cell if redistributionFactorCell is included;
otherwise the serving frequency;
In both cases, redistrFactor[0] is set to redistributionFactorServing;
for each entry in InterFreqCarrierFreqList and subsequent for each entry in InterFreqCarrierFreqListExt:
the cell ranked as the best cell on this frequency according to section 5.2.4.6 if redistributionNeighCellList is configured and includes this cell;
otherwise, the concerned frequency if redistributionFactorFreq is configured and if at least one cell on the frequency fullfills the cell selection criterion S defined in 5.2.3.2;
If the cell is included, redistrFactor[j] is set to the corresponding redistributionFactorCell; If the frequency is included, redistrFactor[j] is set to the corresponding redistributionFactorFreq;
The UE shall choose a redistribution target as follows:
If ueID ≤ 200 · redistrRange [0], the UE shall choose the frequency or the cell corresponding to redistrFactor[0] as its redistribution target or;
If
$$200 \cdot \sum_{j=0}^{j=i-1} \text{redistrRange}[j] < \text{ueID} \leq 200 \cdot \sum_{j=0}^{j=i} \text{redistrRange}[j],$$

then the UE shall choose the frequency or cell corresponding to redistrFactor[i] as its redistribution target;
A. ueID = (IMSI mod 100) · 2 + 1:
If there are no redistribution candidates apart from the serving frequency or cell, the redistrRange[0] = 1.
Otherwise, the redistrRange[i] of E-UTRAN frequency or cell is defined by:

B.
$$\text{redistrRange}[i] = \frac{\text{redistrFactor}[i]}{\sum_{j=0}^{j=(maxCandidates-1)} \text{redistrFactor}[j]}$$

Where: maxCandidates is the total number of frequencies/cells with valid redistrFactor[j].

For another example, information on redistribution may be broadcasted in a manner of being contained in system information in consideration of load balancing of a base station. For example, if a base station is triggered, information on redistribution may be contained. In this case, the information on the redistribution may include probability information. Namely, the base station can broadcast probability information on the number of UEs capable of being camped on the base station in consideration of load balancing in a manner that the probability information is contained in the system information. In this case, UEs may be camped on a base station (or cell) specified on the basis of the probability information contained in the system information.

Yet, in case that UEs selects a camped-on base station based on the probability information contained in the system information, the UEs can select the base station without considering information on a base station on which the UEs previously camped. Hence, when UEs selects a base station based on probability information, UEs for which movement is unnecessary may perform reselection of a base station in consideration of load balancing. Namely, since UEs for which base station movement is unnecessary perform base station reselection, as shown in FIG. 3, it may cause a problem that power consumption increases.

For another example, in HetNets environment in which a macro cell and a small cell coexist, redistribution can be performed in consideration of load balancing. Particularly, referring to FIG. 4, in HetNets macro cell layer(s) and small cell layer(s) may have the same or different frequency carriers. There can be multiple small cells of the same or different carrier frequencies overlaid with macro cell(s) of the same or different carriers. In conventional macro only system, different carriers are largely overlapped with each other as (F1 MC1; F2 MC2) shown in FIG. 4.

However, in HetNets, small cell coverages are only overlaid with part of the macro cell coverages. Different small cell of different carriers may be or in many cases may be not overlaid with each other. Different small cells of the same or different carriers may have different load conditions; as a result they may have different load balancing requirements relative to the macro cell carriers and other small cell carriers. At this point, Comparing with macro only systems, potentially there will be several problems.

First, there can be ping-pong problems if there are multiple small cells of the same carrier overlaid with a different macro carrier and the load balance needs of the small cells can not be differentiated. For example, in FIG. 4, if SC2 is overloaded, SC1 and SC4 are under loaded, and the macro layer e.g. (F1, MC1) can only treat all the SC1, SC2 and SC4 the same as F3, then the instruction from the MC1 can only be offloading from F1 to F3 as the normal macro to small layer offload operation.

If SC2 is overloaded and the operator sets the parameter at (F3, SC2) to offload to (F1, MC1), the idle UEs offload from overloaded (F3, SC2) to (F1, MC1) will be pingponging between SC2 and MC1 while they are in SC2 coverage.

Second, since the coverage of a small cell only overlaps with small portion of the overlaid macro cell coverage, if they are treated the same as the fully overlapped macro cell carriers in the macro only system, the situation of lack offload to small cells can occur.

Figure 4:
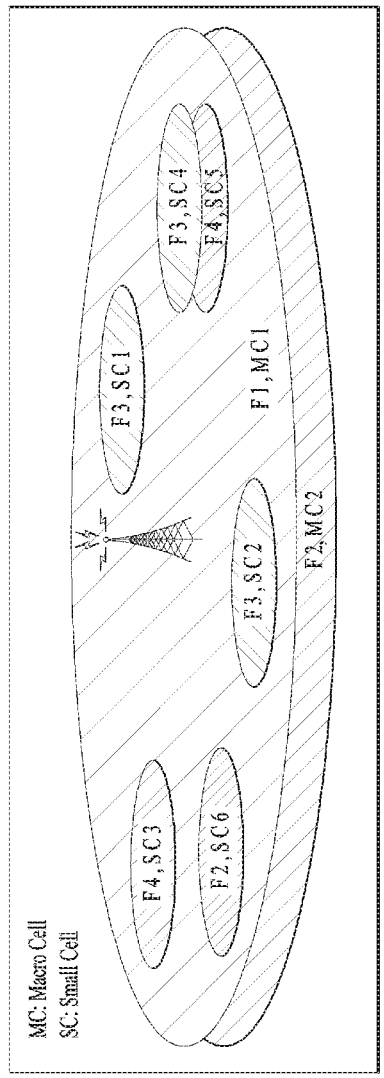
FIG. 4 is a diagram showing a heterogeneous cell environment.

For example in FIG. 4, the macro only redistribution method assumes the carriers F1, F2, F3 and F4 are fully overlapped. Even the operator intends to instruct 100% of UEs being redistributed to F3 and F4 by setting 50% to F3 and 50% to F4 with 0% to F1 and 0% to F2, at the (F3, SC2)

coverage, only 50% of idle UEs reselect to F3 with the 50% picked F4 stay with the macro layer. Similarly, only 50% of the UEs go to F4 under the SC3 coverage. As a result, only 50% of idle UEs go to the small cell layer rather than intended 100%.

Third, in the case of small cells of different frequencies that are also overlapped, we need to ensure the idle UEs are properly distributed across the overlaid small cells while prevent ping-pongs between the small cell layer and macro layer as well as among the small cells. For example in FIG. 4, if both SC4 and SC5 are overloaded, we need to prevent the UEs offload from SC4 to the macro layer move to SC5 and vice versa.

In general, additional efforts need to be made to address the new issues in HetNet scenarios. In HetNets, normally the operators will configure the system to make UEs more likely or having high priority to reselect to the overlaid small cells such that the macro cell layer can offload as much as traffic to the small cell layer. It can be easily to get about 100% UE camping on overlaid small cell even with existing priority based method. Now one of the key issues is how to properly redistribute the UEs back to the macro layer when the small(s) is overloaded.

In general, additional efforts need to be made to address the new issues in HetNet scenarios. In HetNets, normally the operators will configure the system to make UEs more likely or having high priority to reselect to the overlaid small cells such that the macro cell layer can offload as much as traffic to the small cell layer. It can be easily to get about 100% UE camping on overlaid small cell even with existing priority based method. Now one of the key issues is how to properly redistribute the UEs back to the macro layer when the small(s) is overloaded.

To solve above problem, a probability based approach to use the broadcast instruction to redistribute the idle UEs is applied. The network broadcasts the percentage of idle UEs to be redistributed to each carrier. When a UE received the re-distribution percentage instruction from the RAN, it will consider the percentage value as the probability of the reselection to the target carrier. The UE will then conduct a re-distribution test to determine the target carrier that has the highest priority.

Figure 5:
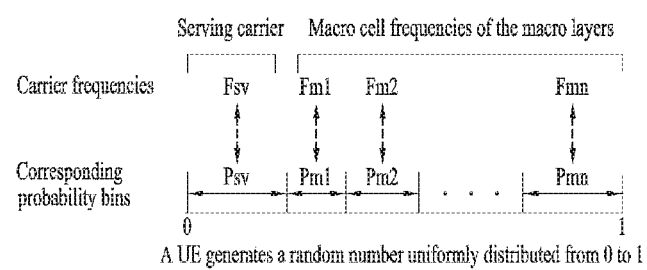
FIG. 5 is a diagram showing a method for a user equipment to select a cell based on probability.

When a re-distribution test is triggered, the UE first collects all the probability values in the SIB as shown in FIG. 5. The UE determines the probability of stay a carrier based on the equation 1.

$$P_{sv}+P_{m1}+P_{m2}+\ldots+P_{mn}=1, \qquad \text{[Equation 1]}$$

Where Psv is the probability of staying with current serving carrier, Pm1, Pm2, . . . , Pmn are the probabilities to reselect to the macro carrier frequencies Fm1, Fm2, . . . , Fmn respectively. The UE randomly generates a value of uniform distribution over 0 to 1. The UE considers the frequency carrier associated to this value to be the highest priority as per FIG. 5. UE then performs normal the priority based reselection (to that carrier with the highest priority). The UE considers this target carrier having the highest priority until the next re-distribution test.

When redistribution parameters are changed or a UE reselects to a new cell, a read of the SIB will be triggered. However, a SIB read can be triggered by other reasons such as other parameters change. Therefore, a SIB read alone can not be the only condition for triggering the re-distribution test. A re-distribution test control bit is added to the SIB and the control bit is toggled to indicate request the UE to perform re-distribution test. To support the cell condition changes due to the UE mobility, whenever a UE reselected to a new cell, the re-distribution test is triggered if the control bit presents.

Specifically, a reselection probability (redistribution percentage) for each of the carrier listed in the SIB and a re-distribution test bit is added.

Note that this new feature does not impact UEs receiving eMBMS service or UEs with dedicated priorities. With eMBMS, idle redistribution is even more critical. Onec the eMBMS is turned on at a carrier, the capacity in that carrier would be significantly reduced. We would need to redistribute the UEs to avoid congestion of the eMBMS carriers With this broadcast probability based approach, operators can easily redistribute percentage of idle UEs camping on the serving carrier to the target carrier. The idle redistribution is performed efficiently with minimal signaling overhead and delay.

Also, avoid the ping-pong issue as discussed above, after a reselection is completed, a UE considers its last serving cell to be the lowest priority in the UE's local priority list even if the last serving frequency is the highest priority in the current serving cell. Only when the re-distribution test is triggered by the toggling of the re-distribution test bit, is the UE allowed to reselect back to its last serving cell.

As is shown on section 2.1, small cells of different carrier frequencies do not fully overlap with the umbrella macro cell(s). In majority of the cases small cell eNBs do not support multiple carriers for cost saving, as a result the small cells may not fully overlap with each other. Therefore, it is more suitable to treat all the overlaid small cells frequencies as one small cell layer equivalent to a macro cell carrier. By doing this we could maintain the operations in general at a per carrier basis and minimize the complexity of the procedures and signaling overhead.

This can be achieved by using a common probability value for all the small cell carrier frequencies.

Figure 6:
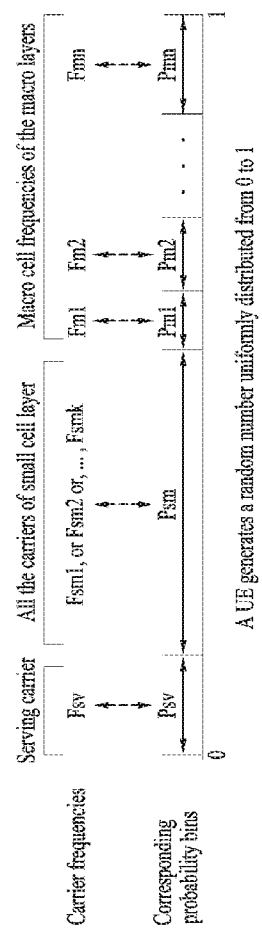
FIG. 6 is a diagram showing a method for a user equipment to select a cell based on probability.

Also, in FIG. 6, the UE determines the probability of stay a carrier based on the equation 2.

$$Psv+Psm+Pm1+Pm2+\ldots+Pmn=1, \qquad \text{[Equation 2]}$$

Where Psv is the probability of staying with current serving carrier, Psm is the common probability to reselect to the small cell layers, Pm1, Pm2, . . . , Pmn are the probabilities to reselect to the macro carrier frequencies Fm1, Fm2, . . . , Fmn respectively.

Also, if small cell layer is selected as the target, all the small cell frequencies (Fsm1, Fsm2, . . . Fsmk as shown in FIG. 6) listed in the SIB are considered to be equally the highest priority. Note that no explicit indication of small cell layer as such is necessary (as small cell concept is not directly signaled to the UE) but instead the frequencies using a common probability value are listed separated in the SIB.

As described above, redistribution can be performed in consideration of load balancing. Yet, when UEs selects a base station based on probability information, UEs for which movement is unnecessary may perform reselection of a base station in consideration of load balancing. Namely, since UEs for which base station movement is unnecessary perform base station reselection, as shown in FIG. 3, it may cause a problem that power consumption increases. A method of performing redistribution in consideration of the aforementioned problem is described as follows.

A network (or, a base station) may broadcast system information containing a redistribution parameter. In doing so, for example, the redistribution parameter may include information on redistribution statistics. For example, the redistribution parameter may be configured with "redistributionInfo_prev, redistributionInfo". Here, redistributionInfo_prev may be previous redistribution statistics information on a frequency/cell (or base station). Moreover, redistributionInfo may be redistribution statistics intended for a frequency/cell.

Namely, redistributionInfo_prev may be information on previous redistribution, and redistributionInfo may be information on redistribution desiring to be redistributed in consideration of load balancing. Yet, redistributionInfo_prev may include other information on the previous redistribution, which is non-limited by the aforementioned embodiment.

Through this, a UE can perform redistribution in a manner of comparing with previous redistribution information.

For another example, a UE may store previous redistribution statistics information. Namely, after previous redistribution has been performed, the UE may store information on it. Here, in redistribution parameters of system information sent by a network, redistributionInfo information may be contained only. Through this, information contained in the system information can be reduced.

Thereafter, a redistribution procedure can be triggered. Here, if the redistribution procedure is triggered, the UE can perform a redistribution target selection. In doing so, the UE may perform the redistribution target selection using the redistribution parameter information included in the system information. Namely, the UE can perform the redistribution target selection in a manner of comparing the previous redistribution information and the intended redistribution information.

In doing so, for example, the UE can categorize a list of frequencies/cells (or, base stations). Here, the UE can categorize the frequencies/cells (or, base stations) into three groups based on a specific value. In this case, the three groups may be identified as a group of maintaining a frequency/cell ("for staying"), a group entering a specific frequency/cell ("for incoming") and a group leaving a specific frequency/cell ("for outgoing"). Here, regarding the three groups, since the UE can maintain the previously camped-on frequency/cell in the frequency/cell maintaining group ("for staying") and the group entering the specific frequency/cell ("for incoming"), it may not perform a special operation.

Yet, since the UE can move from the previously camped-on frequency/cell in the group leaving the specific frequency/cell ("for outgoing"), it is able to perform a frequency shift, which will be described later.

Moreover, the name of the aforementioned group may not be specifically limited but may be determined depending on a presence or non-presence of maintaining a frequency/cell and a presence or non-presence of 'incoming/outgoing' of a frequency/cell.

Moreover, a specific value may include a delta value. Here, the delta value may include a difference between a current redistribution probability/factor and a previous redistribution probability/factor, which may be represented as Equation 3.

$$\text{delta}_i = rc_i - rp_i \qquad \text{[Equation 3]}$$

Here, "i" may be frequency/cell index within the set of listed frequencies, "rci" may be intended redistribution probability/factor included in redistributionInfo, and "rpi" may be previous redistribution probability/factor included in redistributionInfo_prev.

Namely, the UE finds a delta value by comparing previous and current informations on redistribution for a specific frequency/cell in the list and is then able to perform frequency selection using it.

For example, a UE can be categorized into one of three groups based on the delta value. The groups may include Sp, Sz and Sn. Here, Sp may correspond to a case that deltai is a value greater than 0 (i.e., positive value). Here, Sp may mean an incoming group from another frequency/cell. And, Sz may correspond to a case that deltai is 0. Here, Sz may include a group maintaining a frequency/cell. Moreover, Sn may correspond to a case that deltai is a value smaller than 0 (i.e., negative value). Here, Sn may include an outgoing group to anther frequency/cell.

In this case, a UE camped on a frequency/cell corresponding to the group Sn may move to one of frequencies/cells (or base stations) of Sp among the aforementioned groups. Namely, the UE compares previous redistribution information and current redistribution information with each other and may then move to one of frequencies having a delta value greater than 0.

Moreover, for one example, a UE can determine a redistribution target based on the aforementioned groups.

Figure 7:
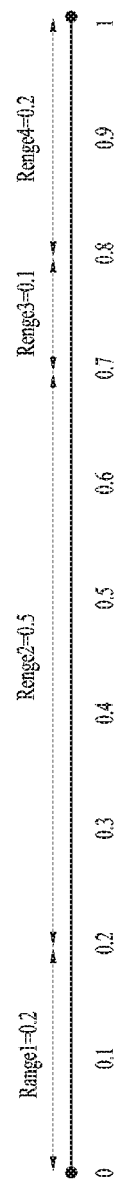
FIG. 7 is a diagram showing redistribution ranges.

In particular, referring to FIG. 7, distribution ranges are set and a redistribution target selection can be performed. In doing so, for one example, a UE can recognize that all frequencies are included in Sp or Sz, and the distribution ranges can be set as Equation 4.

$$\text{Range}_i = \frac{rc_i}{\sum_{\forall j \in S_p} rc_j} \quad \text{[Equation 4]}$$

On the other hand, if at least one or more frequencies exist in Sn, some UE may need to shift a camped-on frequency. In particular, UEs camped on the frequencies included in Sp or Sz may select a redistribution target as a serving frequency. On the other hand, a UE camped on a frequency included in Sn may need to shift a serving frequency. In doing so, for one example, if an index of a frequency included in Sn is i, when the i index frequency is redistributed into the i index frequency, redistribution ranges can be set as Equation 5.

$$\text{Range}_i = \frac{rc_i}{rp_i} \quad \text{[Equation 5]}$$

Moreover, for one example, if an index of a frequency included in Sn is i, when the i index frequency is redistributed into a k index frequency corresponding to a frequency included in Sp, the distribution ranges can be set as Equation 6.

$$\text{Range}_{k|k \in S_p} = \left(1 - \frac{rc_i}{rp_i}\right) \times \frac{\text{delta}_k}{\sum_{\forall j \in S_p} \text{delta}_j} \quad \text{[Equation 6]}$$

By the aforementioned Distribution Ranges, redistribution target selection can be performed. Here, the redistribution target selection can be performed in a manner of generating a random number from uniform distribution [0, 1] and then selecting a target frequency corresponding to the redistribution range related to the random number. For example, referring to FIG. 7, a UE camped on a frequency included in Sn can select a random number from the uniform distribution [0, 1]. Thereafter, the UE camped on the frequency included in Sn can select a frequency included in Sp based on the aforementioned Distribution Ranges. In this case, in FIG. 7, a range of carrier frequency/cell 1 may be set to 0.2, a range of carrier frequency/cell 2 may be set to 0.5, a range of carrier frequency/cell 3 may be set to 0.1, and a range of carrier frequency/cell 4 may be set to 0.2. In doing so, for one example, if a random number is 0.3, a UE can select frequency/cell 2. Namely, the aforementioned Distribution Ranges may be a probability value for the random number selected by the UE. Hence, based on redistribution, 20% of UEs may be disposed in frequency/cell 1, 50% of UEs may be disposed in frequency/cell 2, 10% of UEs may be disposed in frequency/cell 3, and 20% of UEs may be disposed in frequency/cell 4. Through this, a UE can perform a frequency redistribution procedure and a detailed embodiment shall be described as follows.

Embodiment 1

Figure 8:
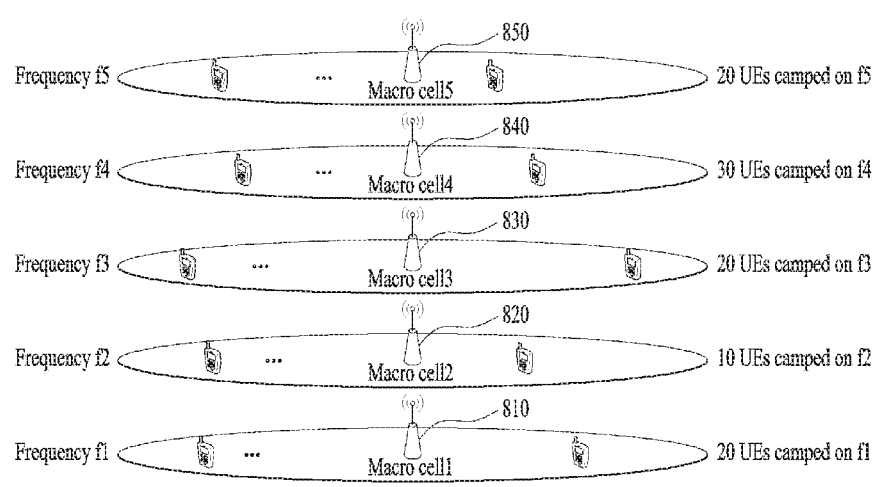
FIG. 8 is a diagram showing a state that user equipments are camped on each base station in consideration of load balancing.

FIG. 8 is a diagram showing a state that user equipments are camped on each base station in consideration of load balancing.

Particularly, referring to FIG. 8, a plurality of UEs may be camped on cells 810, 820, 830, 840, and 850. Here, although there is a macro cell in FIG. 8, this embodiment is identically applicable to an environment of a different type cell or a heterogeneous cell, by which the present embodiment is non-limited.

Referring to FIG. 8, a plurality of UEs camped on cells 810, 820, 830, 840, and 850 may be in idle mode. As described above, a state that a plurality of UEs are camped on may include previous redistribution statistics. Namely, after UEs have been camped on in a previous state, if the UEs switch to the idle mode, redistribution can be performed in consideration of a further situation of being camped on, which is mentioned in the foregoing description.

Referring to FIG. 8, based on previous redistribution statistics, 20% of UEs may be camped on the first cell (or f1) 810. 10% of UEs may be camped on the second cell (or f2) 820. 20% of UEs may be camped on the third cell (or f3) 830. 30% of UEs may be camped on the fourth cell (or f4) 840. And, 15% of UEs may be camped on the fifth cell (or f5) 850. In doing so, for one example, a network (or base station) may broadcast system information containing a redistribution parameter. In doing so, for one example, as described above, the redistribution parameter may contain information "redistributionInfo_prev" and information "redistributionInfo". Or, "redistributionInfo_prev" is already stored in a UE and the information "redistributionInfo" can be sent by being contained in the redistribution parameter only, which is already described.

Here, based on FIG. 8, redistributionInfo_prev is the information on "previous redistribution probabilities/factors for f1, f2, f3, f4, f5" and can be expressed as Equation 7.

$$\{rp_1, rp_2, rp_3, rp_4, rp_5\} = \{0.2, 0.1, 0.2, 0.3, 0.2\} \quad \text{[Equation 7]}$$

And, redistributionInfo is the information on "Intended redistribution probabilities/factors for f1, f2, f3, f4, f5" and can be expressed as Equation 8. Namely, the information may be a rate to be adjusted in consideration of load balancing.

$$\{rc_1, rc_2, rc_3, rc_4, rc_5\} = \{0.25, 0.2, 0.2, 0.25, 0.1\} \quad \text{[Equation 8]}$$

Thereafter, if a redistribution procedure is triggered, the UE can perform redistribution target selection. In doing so, the UE finds a delta value as a specific value for a frequency (or cell) list and is then able to configure a group. Here, the delta value may be determined as a difference value between redistributionInfo and redistributionInfo_prev for each frequency (or cell), and may be expressed as Equation 9.

Delta={+0.05,+0.1,0,−0.05,−0.1}     [Equation 9]

Here, 3 groups can be determined according to delta values. The groups can be categorized into a case ($S_p$) that a delta value is a positive number, a case ($S_z$) that a delta value is 0, and a case ($S_n$) that a delta value is a negative number. Based on Equation 9, $s_p=\{f_1, f_2\}$, $S_z=\{f_3\}$ and $s_n=\{f_4, f_5\}$ can be set. In doing so, for one example, some of UEs included in $f_4$, $f_5$ that is a frequency included in $S_n$ may be moved to a prescribed frequency in a frequency list included in $S_p$.

As described above, as a UE determines Distribution Ranges, the UE can be moved. In particular, UEs camped on $f_1$, $f_2$ or $f_3$ may directly set a serving frequency as a redistribution target. On the other hand, as UEs included in $f_4$ or $f_5$ can move to $f_1$ or $f_2$, Distribution Ranges are determined and a redistribution target can be set based on the determined distribution ranges.

For example, a redistribution value shifted from $f_4$ to $f_4$ may be expressed as Equation 10. A redistribution value shifted from $f_4$ to $f_1$ may be expressed as Equation 11. And, a redistribution value shifted from $f_4$ to $f_2$ may be expressed as Equation 12.

$$\text{Range}_4 = \frac{0.25}{0.3} = 0.833 \quad [\text{Equation 10}]$$

$$\text{Range}_1 = \left(1 - \frac{0.25}{0.3}\right) \times \frac{0.05}{0.05 + 0.1} = 0.056 \quad [\text{Equation 11}]$$

$$\text{Range}_2 = \left(1 - \frac{0.25}{0.3}\right) \times \frac{0.1}{0.05 + 0.1} = 0.111 \quad [\text{Equation 12}]$$

Moreover, a redistribution value shifted from $f_5$ to $f_5$ may be expressed as Equation 13. A redistribution value shifted from $f_5$ to $f_1$ may be expressed as Equation 14. And, a redistribution value shifted from $f_5$ to $f_2$ may be expressed as Equation 15.

$$\text{Range}_5 = \frac{0.1}{0.2} = 0.5 \quad [\text{Equation 13}]$$

$$\text{Range}_1 = \left(1 - \frac{0.1}{0.2}\right) \times \frac{0.05}{0.05 + 0.1} = 0.167 \quad [\text{Equation 14}]$$

$$\text{Range}_2 = \left(1 - \frac{0.1}{0.2}\right) \times \frac{0.1}{0.05 + 0.1} = 0.333 \quad [\text{Equation 15}]$$

Here, based on the above Equations, UEs included in $f_4$ or $f_5$ can perform redistribution target selection. In doing so, based on the aforementioned redistribution range, the redistribution target selection generates a random number from [0, 1] uniformly distributed in [0, 1], and a UE can perform redistribution target selection based on the random number, which is already mentioned in the foregoing description.

Figure 9:
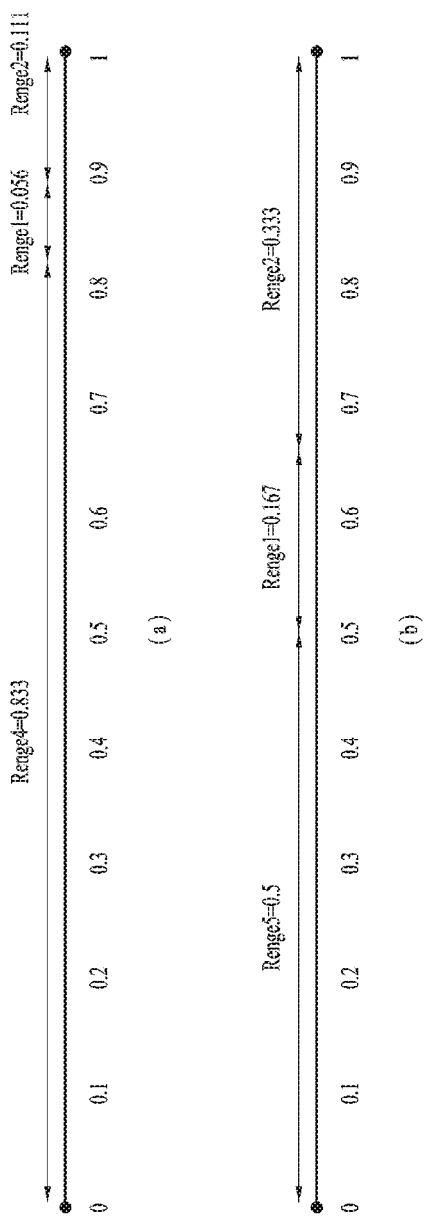
FIG. 9 is a diagram showing redistribution ranges.

For example, referring to FIG. 9 (a), UEs camped on $f_4$ can perform redistribution target selection based on a redistribution range. For example, a range of maintaining a frequency from $f_4$ to $f_4$ may be 0.833 based on Equation 10. And, a range of shifting a frequency from $f_4$ to $f_1$ may be 0.056 based on Equation 11. Moreover, a range of shifting a frequency from $f_4$ to $f_2$ may be 0.111 based on Equation 12. In this case, as described above, as a UE performs redistribution target selection based on a random number, 83.3% of UEs camped on $f_4$ maintain $f_4$, 5.6% move to $f_1$, and 1.1% may move to $f_2$. Namely, a redistribution range value may be a probability value. Based on this, the UEs camped on $f_4$ performs the redistribution target selection. Hence, frequency shift is performed on some of the UEs only, other UEs can maintain the frequency, and through this, load balancing can be performed.

Moreover, referring to FIG. 9 (b), UEs camped on $f_5$ can perform redistribution target selection based on a redistribution range. For example, a range of maintaining a frequency from $f_5$ to $f_5$ may be 0.5 based on Equation 13. A range of shifting a frequency from $f_5$ to $f_1$ may be 0.167 based on Equation 14. A range of shifting a frequency from $f_5$ to $f_2$ may be 0.333 based on Equation 15. In this case, as described above, as a UE performs redistribution target selection based on a random number, 50% of UEs camped on $f_5$ maintain $f_5$, 16.7% move to $f_1$, and 33.3% may move to $f_2$. Namely, a redistribution range value may be a probability value. Based on this, the UEs camped on $f_5$ performs the redistribution target selection. Hence, frequency shift is performed on some of the UEs only, other UEs can maintain the frequency, and through this, load balancing can be performed.

In doing so, as described above, if redistribution target selection is performed, it may be represented as Table 2. Namely, redistribution can be performed in redistribution-Info state. In doing so, as described above, UEs for performing frequency shift are determined based on the grouping and the range value. Therefore, UE's frequency shift can be minimized and power consumption can be reduced.

TABLE 2

| | |
|---|---|
| 20% UEs on f1 | 25% UEs (20% from f1 + 5% from f4 and f5) |
| 10% UEs on f2 | 20% UEs (10% from f2 + 10% from f4 and f5) |
| 20% UEs on f3 | 20% UEs on f3 (No reselection) |
| 30% UEs on f4 | 25% UEs on f4 (5% UEs move to f1 and f2) |
| 20% UEs on f5 | 10% UEs on f5 (10% UEs move to f1 and f2) |

Figure 10:
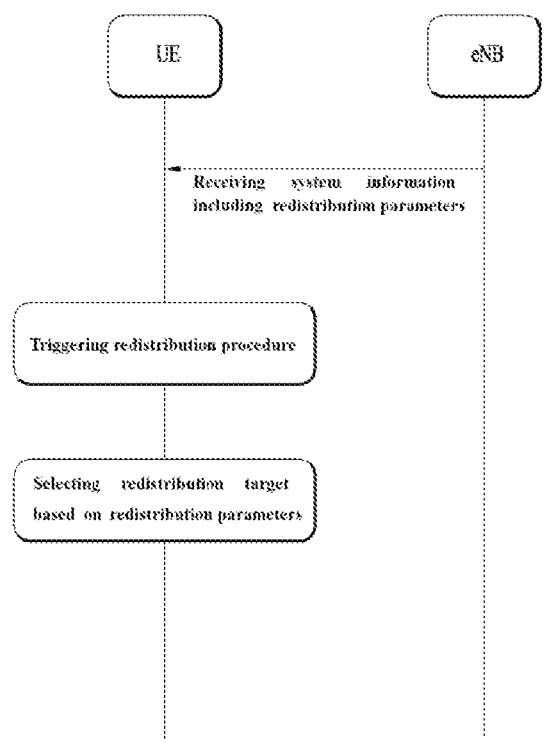
FIG. 10 is a diagram showing a method for a user equipment to perform cell-reselection.

FIG. 10 is a diagram showing a method for a user equipment to perform cell-reselection.

Referring to FIG. 10, a UE 110 can receive system information containing redistribution parameters from a base station (eNB) 105. In doing so, for example, the base station 105 may include the aforementioned network end, by which the base station is non-limited. The system information may include information broadcasted from the base station 105. Namely, the base station 105 can broadcast the system information to send to a plurality of UEs.

The UE 110 may include a UE in idle mode. In doing so, as described above, for example, the UE 110 can operate in idle mode in FIGS. 1 to 9. In doing so, for example, if there is data to be sent to or received from the base station 105, the UE 110 can communicate with the base station 105 by switching to a connected mode. If the UE 110 completes data transmission or reception, the UE 110 can switch to the idle mode. Yet, as described above, the UE 110 in idle mode may receive system information from the base station 105.

Subsequently, the UE may trigger a redistribution procedure. Namely, if desiring redistribution, the UE can perform the redistribution procedure. For example, based on measurement information related to load balancing, if it is equal to or greater than a threshold, the UE can trigger the redistribution procedure. And, the UE may trigger the redistribution procedure in different ways, by which the present embodiment is non-limited.

Subsequently, based on the redistribution parameter, the UE can select a redistribution target. In doing so, for example, in the redistribution parameter, current redistribution statistics information may be contained. Here, the current redistribution statistics information may include the aforementioned redistributionInfo. Moreover, for example, in the redistribution parameter, previous redistribution statistics information may be contained. Here, the previous redistribution statistics information may include the aforementioned redistributionInfo_prev. For another example, the previous redistribution statistics information may be stored in the UE, by which the present embodiment is non-limited.

In doing so, by comparing the previous redistribution statistics information and the current redistribution statistics information with each other, the UE can select the redistribution target. For example, the previous redistribution statistics information and the current redistribution statistics information may include information on each frequency included in a frequency list stored in the UE. In particular, the previous redistribution statistics information and the current redistribution statistics information may include probability information of UE that can be camped on each frequency, as describe above. Based on a difference value resulting from subtracting probability of each frequency included in the previous redistribution statistics information from probability of each frequency included in the current redistribution statistics information, the UE can select the redistribution target. Here, the difference value may include the aforementioned delta value. As describe above, based on the delta value, UEs can be categorized into three groups. For a frequency having a delta value set to a negative value, distribution ranges can be set. In this case, as described above, a UE camped on a frequency having a negative delta value can perform frequency shift based on the distribution ranges.

Figure 11:
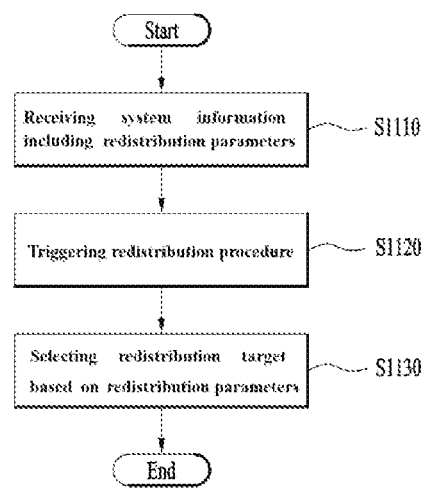
FIG. 11 is a diagram showing a method for a user equipment to perform cell-reselection.

FIG. 11 is a diagram showing a method for a user equipment to perform cell-reselection.

Referring to FIG. 11, a UE can receive system information containing redistribution parameters [S1110]. In doing so, as described with reference to FIGS. 1 to 10, the system information may be broadcasted from a base station. And, as described above, the UE in idle mode can receive system information from the base station.

Subsequently, the UE can trigger a redistribution procedure [S1120]. In this case, as described with reference to FIGS. 1 to 10, if the redistribution procedure is triggered, the UE may perform a procedure for setting a redistribution target as a cell reselection, as described above.

Subsequently, based on the redistribution parameters, the UE can select a redistribution target [S1130]. Here, as described with reference to FIGS. 1 to 10, the redistribution parameters may contain current redistribution statistics information. In this case, the redistribution target may be selected on the basis of the current redistribution statistics information. In particular, the redistribution target can be selected based on the current redistribution statistics information and the previous redistribution statistics information, as described above. Thereafter, if the UE switches from the idle mode to a connected mode, the UE can be camped on the selected redistribution target, as described above.

Figure 12:
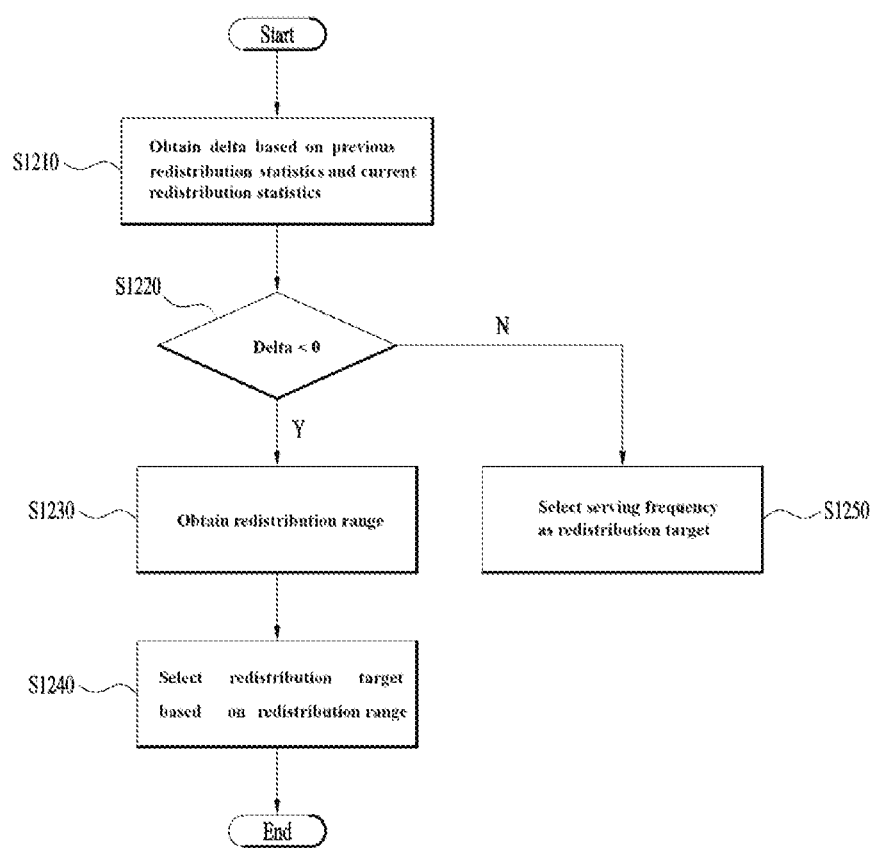
FIG. 12 is a diagram showing a method for a user equipment to perform cell-reselection.

FIG. 12 is a diagram showing a method for a user equipment to perform cell-reselection.

Referring to FIG. 12, a UE can obtain a delta value based on previous redistribution statistics information and current redistribution statistics information [S1210]. Here, as described with reference to FIGS. 1 to 11, the UE may have frequency list information. The previous redistribution statistics information and the current redistribution statistics information may include probability of the number of UEs camped on each frequency contained in the UE's frequency list information. The UE can set a delta value to a difference value resulting from subtracting probability of each frequency contained in the previous redistribution statistic information from probability of each frequency contained in the current redistribution statistics information. Namely, the delta value can be calculated per frequency. Thereafter, based on the delta value, the UE can select a redistribution target.

If the delta value is smaller than 0 [S1220], the UE can calculate a redistribution range [S1230]. In doing so, as described with reference to FIGS. 1 to 11, a redistribution range can be calculated only for a frequency having a delta value smaller than 0 among frequencies. Namely, as described above, UEs camped on the frequency having the delta value smaller than 0 can perform frequency shift.

Subsequently, based on the redistribution range, the UE can select a redistribution target [S1240]. In this case, as described with reference to FIGS. 1 to 12, if the UE is camped on a frequency having a delta value smaller than 0, the UE can select a redistribution target according to the redistribution range. Here, the redistribution range may include probability information. Through this, the UE can select a redistribution target.

On the other hand, if the delta value is not smaller than 0 [S1220], the UE can select a serving frequency as a redistribution target [S1250]. In this case, as described with reference to FIGS. 1 to 11, if the delta value is equal to or greater than 0, UEs camped on the frequency corresponding to the delta value may not perform the frequency shift. Namely, as described above, the UEs select the serving frequency as the redistribution target and may not perform the frequency shift.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, both an apparatus invention and a method invention are described in the present specification, and may be supplementarily applicable if necessary.

What is claimed is:

1. A method for performing a cell reselection by a user equipment (UE) in an idle mode in a wireless communication system, the method comprising:
receiving system information including redistribution information,
wherein the redistribution information includes current redistribution statistic information including information for a redistribution probability for each of frequencies included in a frequency list;
triggering a redistribution procedure;
grouping the frequencies based on a difference of the redistribution probability for each of the frequencies included in the current redistribution statistic information and a previous redistribution probability for each of the frequencies included in previous redistribution statistic information; and
selecting a redistribution target based on the grouping result of the frequencies,
wherein the frequencies are grouped into a first group having a value of the difference set to a positive number, a second group having the value of the difference set to zero, and a third group having the value of the difference set to a negative number.

2. The method of claim 1, wherein the UE is camped on the selected redistribution target when the UE switches to a connected mode from the idle mode.

3. The method of claim 1, wherein the redistribution information further includes the previous redistribution statistic information.

4. The method of claim 1, wherein the previous redistribution statistic information comprises information stored in the UE.

5. The method of claim 1, further comprising:
determining a serving frequency as the redistribution target when the UE is camped on a frequency included in the first group and the second group.

6. The method of claim 1, further comprising:
determining distribution ranges; and
determining the redistribution target based on the determined distribution ranges when the UE is camped on a frequency included in the third group.

7. A user equipment (UE) for performing a cell reselection in an idle mode in a wireless communication system, the UE comprising:
a receiver for receiving a signal;
a transmitter for transmitting a signal; and
a processor configured to control the receiver and the transmitter,
wherein the processor is further configured to:
control the receiver to receive system information including redistribution information,
wherein the redistribution information includes current redistribution statistic information including information for a redistribution probability for each of frequencies included in a frequency list,
trigger a redistribution procedure,
group the frequencies based on a difference of the redistribution probability for each of the frequencies included in the current redistribution statistics information and previous redistribution probability for each of the frequencies included in previous redistribution statistic information, and
select a redistribution target based on the grouping result of the frequencies,
wherein the frequencies are grouped into a first group having a value of the difference set to a positive number, a second group having the value of the difference set to zero, and a third group having the value of the difference set to a negative number.

8. The UE of claim 7, wherein the UE is camped on the selected redistribution target when the UE switches to a connected mode from the idle mode.

9. The UE of claim 7, wherein the redistribution information further includes the previous redistribution statistic information.

10. The UE of claim 7, wherein the previous redistribution statistic information comprises information stored in the UE.

11. The UE of claim 7, wherein the processor is further configured to determine a serving frequency as the redistribution target when the UE is camped on a frequency included in the first group and the second group.

12. The UE of claim 7, wherein the processor is further configured to:
determine distribution ranges and
determine the redistribution target based on the determined distribution ranges when the UE is camped on a frequency included in the third group.

13. The method of claim 1, further comprising:
upon switching from the idle mode to a connected mode, camping on the selected redistribution target.

14. The UE of claim 7, wherein the processor is configured to:
camp on the selected redistribution target upon switching from the idle mode to a connected mode.

* * * * *